US009969415B2

(12) United States Patent
Chen et al.

(10) Patent No.: US 9,969,415 B2
(45) Date of Patent: May 15, 2018

(54) TROLLEY WITH A PLAYER

(71) Applicant: CHIGOO INTERACTIVE TECHNOLOGY CO., LTD., Wuxi, Jiangsu (CN)

(72) Inventors: Tao Chen, Wuxi (CN); Chuanrong Pan, Wuxi (CN); Rong Han, Wuxi (CN)

(73) Assignee: CHIGOO INTERACTIVE TECHNOLOGY CO., LTD., Wuxi, Jiangsu (CN)

( * ) Notice: Subject to any disclaimer, the term of this patent is extended or adjusted under 35 U.S.C. 154(b) by 0 days. days.

(21) Appl. No.: 15/119,881

(22) PCT Filed: Feb. 15, 2015

(86) PCT No.: PCT/CN2015/073108
§ 371 (c)(1),
(2) Date: Aug. 18, 2016

(87) PCT Pub. No.: WO2015/124097
PCT Pub. Date: Aug. 27, 2015

(65) Prior Publication Data
US 2017/0050658 A1 Feb. 23, 2017

(30) Foreign Application Priority Data
Feb. 18, 2014 (CN) .................... 2014 2 0068906 U

(51) Int. Cl.
*B62B 3/14* (2006.01)
*B62B 3/02* (2006.01)

(52) U.S. Cl.
CPC ............ *B62B 3/1416* (2013.01); *B62B 3/027* (2013.01); *B62B 3/1424* (2013.01);
(Continued)

(58) Field of Classification Search
CPC .................................................... B62B 3/1416
See application file for complete search history.

(56) References Cited

U.S. PATENT DOCUMENTS 8,978,947 B1 * 3/2015 Schneidau .............. B60R 11/02
224/409
2006/0266904 A1 11/2006 Crum
(Continued)

FOREIGN PATENT DOCUMENTS

CN 201231764 Y 5/2009
CN 203713943 U 7/2014
(Continued)

OTHER PUBLICATIONS

International Search Report (Chinese and English) for PCT/CN2015/073108, ISA/CN, Haidian District, Beijing, dated May 11, 2015.
(Continued)

*Primary Examiner* — John D Walters
*Assistant Examiner* — James J Triggs
(74) *Attorney, Agent, or Firm* — Stephen T. Olson; Harness, Dickey & Pierce, P.L.C.

(57) ABSTRACT

A trolley is disclosed which includes a frame body, a handle and a player, the player and the handle being linked to one another and rotatable with respect to the frame body. Due to the linkage of the player and the handle, the player may rotate as the passengers rotate the handle, which makes the operation convenient and flexible. The player is driven to rotate through the rotation of the handle to adjust an angle of the player, allowing passengers to watch the player conveniently in various situations like standing, sitting, pushing the trolley, etc., which meets different needs of passengers well and also avoids the blocking of the handle to the player.

11 Claims, 3 Drawing Sheets

(52) U.S. Cl.
CPC .......... *B62B 3/1428* (2013.01); *B62B 3/1472* (2013.01); *B62B 3/1492* (2013.01); *B62B 2202/24* (2013.01); *B62B 2202/56* (2013.01)

(56) References Cited

U.S. PATENT DOCUMENTS

2013/0001927 A1* 1/2013 Mellinger ................. B62B 9/26
   280/647
2013/0249202 A1* 9/2013 White ...................... B62B 9/26
   280/769

FOREIGN PATENT DOCUMENTS

| DE | 3717901 A1 | 12/1987 |
|----|------------|---------|
| EP | 1582432 A1 | 10/2005 |
| JP | 2012-218502 A | 11/2012 |
| KR | 20-0388065 Y1 | 6/2005 |
| WO | WO 2006/117627 A1 | 11/2006 |

OTHER PUBLICATIONS

Written Opinion of the ISA (Chinese) for PCT/CN2015/073108, ISA/CN, Haidian District, Beijing, dated May 11, 2015.
Supplementary European Search Report of EP 15752199.8 dated Sep. 28, 2017.
First Office Action (with English summary) regarding counterpart Korean Application No. 10-2016-7026469 dated Jun. 19, 2017 (8 pages).

\* cited by examiner

TROLLEY WITH A PLAYER

CROSS-REFERENCE TO RELATED APPLICATIONS

This application is a 371 U.S. National Stage of International Application No. PCT/CN2015/073108, filed Feb. 15, 2015, which claims the benefit of and priority to Chinese Patent Application No. 201420068906.2, filed Feb. 18, 2014. The entire disclosures of the above applications are incorporated herein by reference.

TECHNICAL FIELD

The present invention relates to a vehicle device and, more particularly, to a trolley equipped with a player.

BACKGROUND

In large-area public places such as an airport, passengers often use trolleys to carry goods or luggage to their destination. As airport passengers increase, trolleys are used by passengers more frequently, which increases the usage thereof in airport. Airport area is so large that passengers may need to ask for directions and look for paths several times before reaching the boarding gate. In this case, a trolley with a player for broadcasting and guiding emerges. This trolley is provided with voice guidance to solve such troubles for passengers. However, since the player of the conventional trolley is generally disposed between right and left sides of the handle of the trolley, it is inconvenient and inflexible for the passengers to operate them, and thus the needs of the passengers cannot be satisfied very well. Meanwhile, passenger's sight may easily be blocked by the handle of the trolley due to the mounting position of the player when the passenger is watching the player. Moreover, there are a series of problems in using the trolley by passengers. For example, some passengers may use the player as a temporary dining-table for convenience and put drink and foods on the surface of the player's display screen, some passengers may use the player as a child seat for children sitting on the player, and so on, all of which may damage the trolley's player, undermine the overall structure of the player, and even endanger users, thereby bringing a safety hazard.

SUMMARY

An object of the present invention is to provide a new trolley.

According to one aspect of the invention, a trolley is provided which includes a frame body, a handle and a player, the player and the handle being linked to one another and rotatable with respect to the frame body. Due to the linkage of the player and the handle, the player may rotate as the passenger turns the handles, which makes the operation convenient and flexible. The player is driven to rotate through the rotation of the handle to adjust an angle of the player, allowing passengers to watch the player easily in various postures such as standing, sitting, or pushing the trolley, etc., which can meet different needs of passengers well and avoid blocking sight to player by the handle.

In some embodiments, the player is fixedly connected to the handle. The player and the handle are linked as a whole, which provides a stable structure and facilitate operation.

In some embodiments, an angle between the player and the handle is 15° to 45°. The handle is parallel to the ground when in normal use, wherein the player is at an angle of 15° to 45° with respective to the ground, thereby preventing passengers from placing goods on the player easily or allowing children sitting on the player, thus protecting the player or the overall structure of the trolley's frame, and protecting users from dangers of safety hazard. Meanwhile, an angle between 15° to 45° can make it convenient for passengers to watch the screen.

In some embodiments, the angle between the player and the handle is 30°, so that the angle between the player and the ground is 30° when the trolley is pushed. Such an angle is preferable for the passengers to watch the screen.

In some embodiments, the trolley may further include a stationary shaft. Each of the left and right sides of upper ends of the frame body has a first hole. Each of the two ends of the handle has a second hole disposed on a same axis as the first hole. The stationary shaft disposed within the first holes and the second holes.

In some embodiments, the trolley may further include a rotatable shaft including an axis and a shaft sleeve disposed outside the axis. Both the player and the handle are fixed to the shaft sleeve, and two ends of the axis connected fixedly with the frame body. The linkage between the player and the handle is achieved through fixation thereof both to the shaft sleeve. The structure of the rotatable shaft is designed to enable the handle and the player to rotate about the axis center and the frame body.

In some embodiments, an angle between the player and said handle may be between 15° to 45°. There is no safety hazard using this angle range which makes the watching of the passengers convenient.

In some embodiments, the angle between said player and the handle is 30°. The player placed at this angle with respect to the ground may be preferable for passengers to watch the screen.

DETAILED DESCRIPTION

The present invention will be described in more details with reference to the accompanying drawings hereinafter.

Example 1

Figure 1:
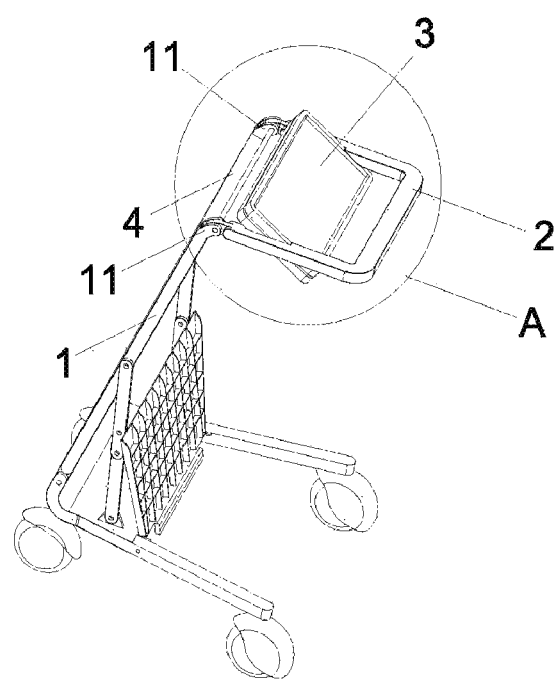
FIG. 1 shows a view of a trolley according to an embodiment of the invention.
Figure 2:
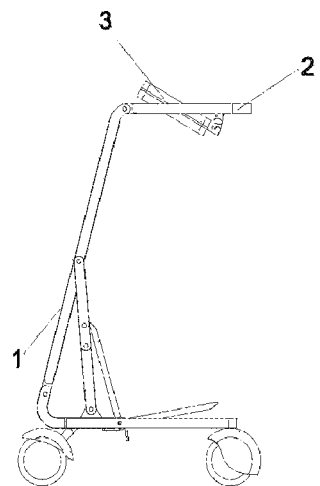
FIG. 2 shows a left view of the trolley according to an embodiment of the invention.
Figure 3:
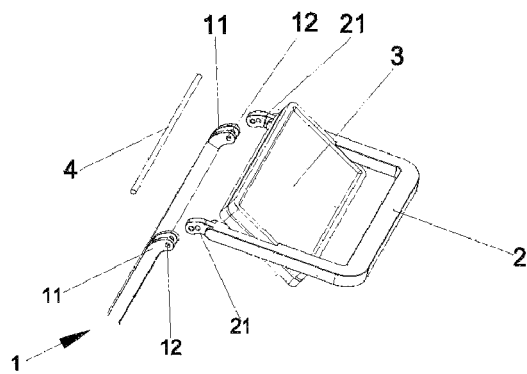
FIG. 3 shows an exploded view of part A shown in FIG. 1.

FIGS. 1 to 3 schematically show a trolley according to an embodiment of the present invention. As shown in the figures, the trolley includes a frame body 1, a handle 2, a player 3 and a stationary shaft 4. The player 3 and the handle 2 are linked to one another and rotatable with respect to the frame body 1.

Upper ends 11 of left and right sides of the frame body 1 are U-shaped. Four first holes 12 are disposed left and right side walls of the upper ends 11 respectively and are coaxial. Two second holes 21 are coaxially disposed on two sides of the handle 2, respectively. Bearings are provided within the first holes 12 and the second holes 21. Two ends of the handle 2 are respectively positioned in the U-shaped upper ends 11 of the frame body 1, so that the above four first holes 12 and two second holes 21 are coaxial. The stationary shaft 4 is passed through the first holes 12 and the second holes 21 and mounted in these holes through bearings, so that the handle 2 is rotatable about the stationary shaft 4 with respect to the frame body 1. It is possible to use such as a set way of the rotatable shaft of a laptop so that the rotation of the handle 2 about the stationary shaft 4 can be stopped at different angles.

The player 3 is fixedly connected to the handle 2, so that the player 3 can rotate along with the rotation of the handle 2. Namely, the player 3 and the handle 2 are linked to one another. The player 3 is driven to rotate through the rotation of the handle 2 to adjust an angle of the player 3 to be even perpendicular to the ground, allowing the passengers to watch the player 3 conveniently in some conditions, such as standing, sitting, pushing the trolley, etc., which makes the operation convenient and flexible. Moreover, the player 3 rotates along with the handle 2 when the handle 2 rotates, which may avoid the blocking of the handle to the player 3. The angle between the player 3 and the handle 2 may be 15°~45°, which allows the passengers to watch the screen of the player conveniently. In this embodiment, the angle between the player 3 and the handle 2 is 30°, and the screen of the player 3 faces toward users. The handle 2 is generally maintained to be parallel to the ground when the trolley is pushed by the passengers, so that the player 3 is at an angle of 30° with respect to the ground, thereby preventing the passengers from placing goods on the player 3 easily or allowing children sitting on the player 3 which may damage the player 3, shorten the service life of the player 3 or undermine the overall structure of the trolley's frame, or even cause danger of safety hazard to users. In the meantime, the angle 30° between the player 3 and the ground may be preferable for the passengers to watch the screen.

Example 2

Figure 4:
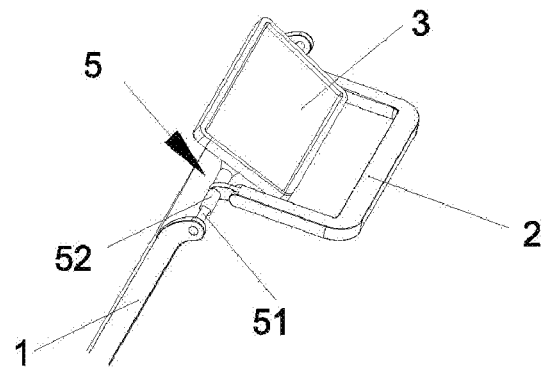
FIG. 4 shows a partial view of the trolley according to another embodiment of the invention.

FIG. 4 schematically shows a trolley according to another embodiment of the present invention. As shown in the drawing, the trolley includes a frame body 1, a handle 2, a player 3 and a rotatable shaft 5.

Figure 5:
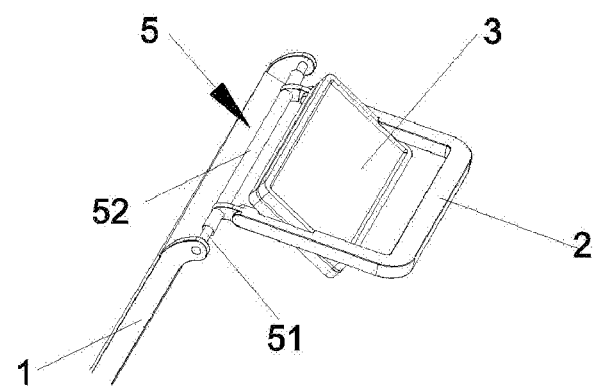
FIG. 5 shows a partial view of the trolley according to another embodiment of the invention.

The rotatable shaft 5 includes an axis 51 and a shaft sleeve 52 disposed outside the axis 51 and being rotatable about the axis 51. Two ends of the axis 51 are connected fixedly to top ends of left and right sides of the frame body 1 respectively. The handle 2 and the player 3 are fixedly mounted on an outer circumferential surface of the shaft sleeve 52, so that the handle 2 and the player 3 can be linked to one another and be rotatable with respect to the frame body 1. In other embodiments, as shown in FIG. 5, the handle 2 is fixedly mounted on the outer circumferential surface of the shaft sleeve 52 and the player 3 is fixedly mounted on the handle 2, which can obtain a linkage between the handle 2 and the player 3 as well. The player 3 is driven to rotate when the handle 2 is turned so as to adjust the angle of the player 3 to be even perpendicular to the ground, allowing the passengers to watch the player 3 conveniently in some conditions, such as standing, sitting, pushing the trolley, etc., thereby making the operation convenient and flexible. Moreover, the player 3 rotates along with the rotation of the handle 2, which may avoid the blocking of the handle to the player 3. The angle between the player 3 and the handle 2 may be 15°~45°, thereby making it convenient for the passengers to watch the player. In this embodiment, the angle between the player 3 and the handle 2 is 30°, which may be preferable for the passengers to watch the screen. The player 3 and the handle 2 may rotate with respect to the frame body 1 when rotating about the axis 51 in the linked way, where the player 3 and the handle 2 may be arbitrarily positioned with respect to the frame body. In other words, the player 3 and the handle 2 may be stopped at any angle within a range from their initial position to a position at which the player 3 is perpendicular to the ground, which may be achieved through a friction between the axis center 51 and the shaft sleeve 52.

The above disclosure is only several specific embodiments of the present invention but not a limitation to the invention. The equivalents made thereto by those skilled in the art according to the technical solution acquired therefrom, should be within the protection scope of this invention.

What is claimed is:

1. A trolley, comprising a frame body, a handle and a player, said player is fixedly connected to said handle with both being linked to one another and rotatable with respect to said frame body, wherein an angle between said player and said handle is 15° to 45°.

2. The trolley according to claim 1, wherein the angle between said player and said handle is 30°.

3. The trolley according to claim 1, further comprising a stationary shaft, wherein each of left and right sides of upper ends of said frame body has a first hole, and both ends of said handle have a second hole respectively being coaxial with said first hole, said stationary shaft disposed within the first holes and the second holes.

4. The trolley according to claim 1, further comprising a rotatable shaft including an axis and a shaft sleeve disposed outside said axis, wherein both said player and said handle are fixed to said shaft sleeve, and both ends of said axis are connected fixedly with said frame body.

5. The trolley according to claim 1, wherein the angle between said player and said handle is 30°.

6. The trolley according to claim 1, wherein the player rotates relative to the frame body along with the handle.

7. The trolley according to claim 3, wherein the handle is rotatable around the stationary shaft with respect to the frame body, the stationary shaft configured to allow rotation of the handle around the stationary shaft to be stopped at different angles.

8. The trolley according to claim 4, wherein the player and the handle are rotatable with respect to the frame body when rotating about the axis in a linked way, wherein the player and the handle are arbitrarily positionable with respect to the frame body.

9. The trolley according to claim 8, wherein the handle and the shaft have a friction therebetween so that the player and the handle are arbitrarily positionable with respect to the frame body.

10. The trolley according to claim 1, wherein the handle has two opposite inner side surfaces each having a respective detent formed therein, and wherein left and right side surfaces of the player are each engaged with the respective detent.

11. The trolley according to claim 1, wherein the handle is a U-shaped handle and includes two free ends, the free ends coupled to the frame body for rotation, the player laterally positioned between spaced apart arms of the U-shaped handle.

* * * * *